US006853568B2

United States Patent
Li et al.

(10) Patent No.: US 6,853,568 B2
(45) Date of Patent: Feb. 8, 2005

(54) ISOLATED VOLTAGE REGULATOR WITH ONE CORE STRUCTURE

(75) Inventors: Wenhua Li, Neihu Taipei (TW);
Zhongwei Ke, Neihu Taipei (TW);
Guisong Huang, Neihu Taipei (TW);
Alpha J. Zhang, Neihu Taipei (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 10/441,620

(22) Filed: May 20, 2003

(65) Prior Publication Data

US 2004/0233686 A1 Nov. 25, 2004

(51) Int. Cl.[7] .............................................. H02M 3/335
(52) U.S. Cl. ............................. 363/65; 363/67; 363/71
(58) Field of Search ......................... 363/21.04, 21.06, 363/65, 67, 69, 70, 71, 125, 130

(56) References Cited

U.S. PATENT DOCUMENTS

| | | | | |
|---|---|---|---|---|
| 6,191,964 B1 | * | 2/2001 | Boylan et al. | 363/89 |
| 6,351,396 B1 | * | 2/2002 | Jacobs | 363/21.06 |
| 6,373,732 B1 | * | 4/2002 | Patel et al. | 363/72 |
| 6,535,400 B2 | * | 3/2003 | Bridge | 363/21.06 |
| 6,574,124 B2 | * | 6/2003 | Lin et al. | 363/65 |
| 6,711,035 B2 | * | 3/2004 | Tomioka | 363/21.06 |
| 6,760,235 B2 | * | 7/2004 | Lin et al. | 363/21.06 |

* cited by examiner

Primary Examiner—Adolf Berhane
(74) Attorney, Agent, or Firm—Webb Ziesenheim Logsdon Orkin & Hanson, P.C.

(57) ABSTRACT

The present invention proposes a new structure for a high input VRM. This structure is similar to a simple buck converter and can simplify the 48V input VRM design. In this present invention, the interleaved voltage regulator is provided. The interleaved voltage regulator includes an integrated magnetic device for performing both transformer and output choke filter function, a first switch, a second switch, a third switch, and a fourth switch, wherein the integrated magnetic device includes a transformer having a first primary winding, a second primary winding, a first secondary winding, and a second secondary winding, a first choke filter having one end coupled to a first terminal of the first secondary winding, and a second choke filter having one end coupled to a first terminal of the second secondary winding, and the other end of the second choke filter coupled to the other end of the first choke filter to form the output terminal of the isolated voltage regulator. The first switch, the second switch, the first choke filter, and the first secondary winding form a synchronous rectifier circuit. The third switch, the fourth switch, the second choke filter, and the second secondary winding form another synchronous rectifier circuit.

12 Claims, 8 Drawing Sheets

US 6,853,568 B2

ISOLATED VOLTAGE REGULATOR WITH ONE CORE STRUCTURE

FIELD OF THE INVENTION

This invention generally relates to a voltage regulator which is used to supply a processor or memory with a low voltage and high current, and more particularly to an isolated high input voltage regulator with one core structure.

BACKGROUND OF THE INVENTION

Modern processors operate under a very low voltage and a high current to meet the demands for faster and more efficient data processing. The voltage regulator module (VRM) must be used to provide power for the microprocessors.

Please refer to FIG. 1, there is depicted an interleaved synchronous buck topology with at least two interleaving channels that is widely used in 5V/12V input VRM. The phase difference between each adjacent interleaving channel is 360 degree divided by the number of channels interleaved.

FIG. 2 shows a basic cell for interleaved synchronous buck converter shown in FIG. 1. A DC voltage input Vin at an input capacitor 210 is connected to the output lead 211 through a rectifier circuit 201, shunted by output capacitance 212. The rectifier circuit 201 contains a high side MOSFET 213, a low side MOSFET 215 and a magnetic device 214 as an output inductor. The drain of low side MOSFET 215 is connected by the source electrode of the high side MOSFET 213 and an input terminal 216 of an inductor 214 to support a freewheeling current. When the high side MOSFET 213 turns on and the low side MOSFET 215 turns off, there will be a high level on the terminal 216 and the current will support a load through the high side MOSFET 213 and the inductor 214. When the high side MOSFET 213 turns off and the low side MOSFET 215 turns on, there will be a low level on the input terminal 216 and the current will be freewheeled through the low side MOSFET 215 and the inductor 214. Therefore, there will be a square waveform voltage on the input terminal 216 of output inductor 214.

In general, the input voltage for most VRMs is 5V or 12V, and the output voltage is lower than 3.3V. An interleaved synchronous buck converter and other improved structures are widely used. A single channel buck converter includes buck switches and an inductor. Buck switches contain a high side MOSFET for conducting a load current from input during the first internal of a conduction/nonconduction period and a low side MOSFET for freewheeling the load current during the second interval other than the first interval. With the current ripple cancel effect, the interleaving technique can reduce the size of both input and output filter and improve the converter's transient response. Therefore, the interleaved buck converter is used to deal with a high current and high slew rate application.

However, the high input current in 12V or 5V input VRM will cause high power loss on the input power bus, and a large input filter is also needed for the increasing transient demand. Therefore, 48V input bus is proposed as alternative to reduce the input current and power bus loss, also to reduce the size of input filter.

Isolation is needed for a 48V input VRM. A basic solution for 48V input VRM is applying two-stage approach in which 48V voltage firstly is transferred to a lower DC voltage by a DC/DC converter, and then an interleaved synchronous buck converter finishes the post energy conversion. But this scheme has too big size because too many semiconductors and at least two magnetic devices should be used. So it aggravates the design and application for 48V input VRM seriously.

For 48V input VRM shown in FIG. 3 illustrates a conventional two-stages VRM schematic of prior art with a front half-bridge converter 304 transferring 48V to a low DC voltage and a post interleaved synchronous buck 302 converter finishing the second-step voltage conversion. Apparently this scheme has one more front converter than 12V VRM topology. So it needs more semiconductors, magnetic devices and other passive devices. The control is also complex because two controllers should be used. Generally, this scheme increases the VRM's cost, profile and complicity for productivity.

Accordingly, what is needed in the art is a new structure which can simplify the VRM design. More particularly, it will be very abstractive if this structure is similar to the buck topology. It is therefore attempted by the applicant to deal with the above situation encountered with the prior art.

SUMMARY OF THE INVENTION

It is therefore an object of the present invention to propose a new structure for a high input VRM. This structure should be similar to a simple buck converter and can simplify the 48V input VRM design.

To achieve the foregoing object, and in accordance with the invention as embodied and broadly described herein, the present invention provides a similar buck topology. In the proposed solution, an integrated magnetic device is employed to achieve a single magnetic device as that of choke in a conventional buck converter, which actually performs as both a power transformer and an output choke filter. For convenient driving consideration, the high side synchronous rectifier is placed in a common ground mode with the low side synchronous rectifier. Therefore, the integrated magnetic device and two synchronous rectifiers construct a rectifier circuit just like a single buck converter. One more switch is needed to provide an expected AC voltage to the primary winding of the rectifier circuit if a resonant reset forward is used. In fact, this switch also is needed to isolate the input voltage during abnormal operation in a 12V or 5V input VRM buck topology. So the present scheme has a very simple structure similar to a buck converter and also maintains the merits of a common 48V input VRM. Furthermore, other topologies can also be used and the number of switches generally used in them won't exceed three just two more than that in a resonant reset forward.

In order to supply much higher load current, two rectifier circuits can be arranged in parallel. The structure can lower the winding current by a half and then reduce the total copper loss.

The rectifier circuits also can be arranged in series in the primary side of the transformer. It will reduce the turn ratio of transformer and then improve the transformer coupling. Good coupling is beneficial to lower leakage inductance and then to reduce the dead time for an output current commutation. When the conduction time for body diode is reduced, the whole efficiency will be improved.

The present invention may best be understood through the following description with reference to the accompanying drawings, in which:

DETAILED DESCRIPTION OF THE PREFERRED EMBODIMENT

Although this invention is susceptible to embodiments of many different forms, a preferred embodiment will be described and illustrated in detail herein. The present disclosure exemplifies the principle of the invention and is not being considered a limitation to the broader aspects of the invention to the particular embodiment as described.

Figure 4:
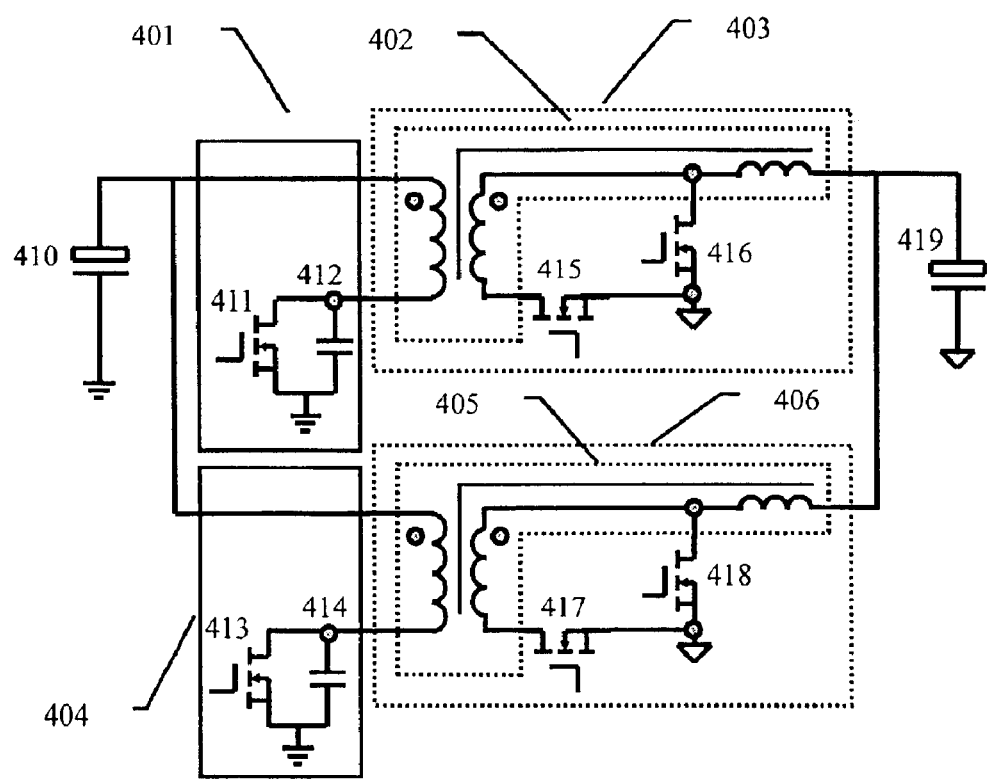
FIG. 4 illustrates the present scheme for 48V input VRM in which integrated magnetic structure, interleaving technique and synchronous rectifying are used.

Referring to FIG. 4, there is the present solution with a simple circuit, low profile and low cost. In this topology, the number of interleaving channels is at least two and the phase difference between each adjacent interleaving channel is 360 degree divided by the number of channels interleaved.

Figure 1:
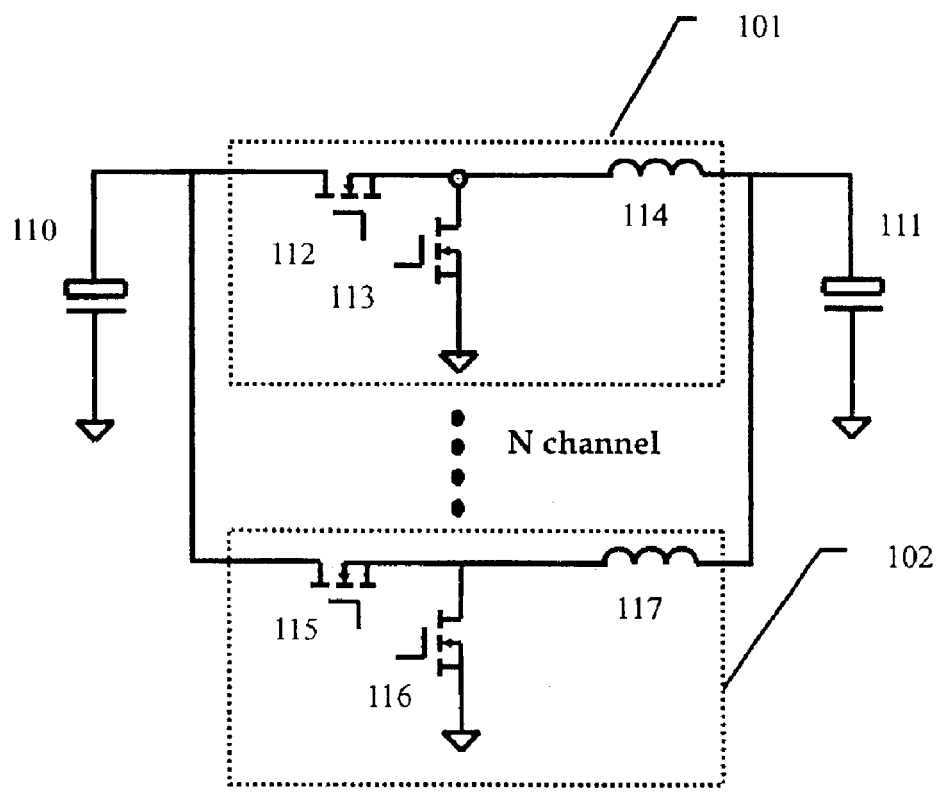
FIG. 1 illustrates an interleaved synchronous buck topology widely used in 5V/12V input VRM according to the prior art.
Figure 2:
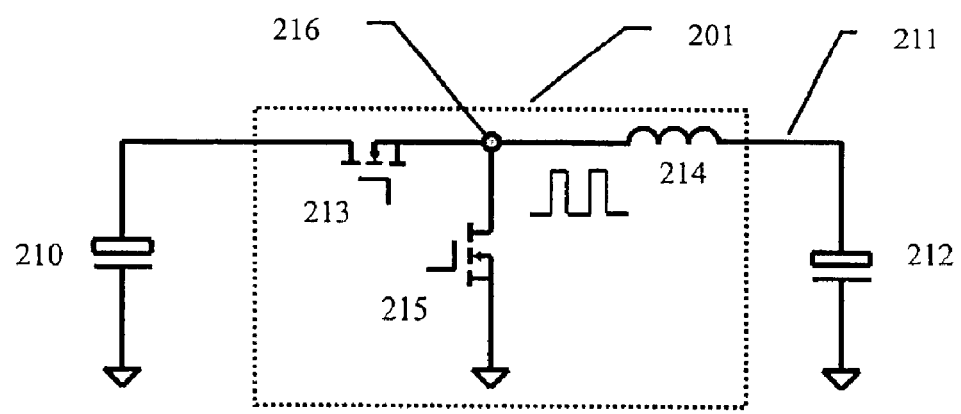
FIG. 2 illustrates a simple synchronous buck which is the basic cell for an interleaved synchronous buck topology according to the prior art.
Figure 3:
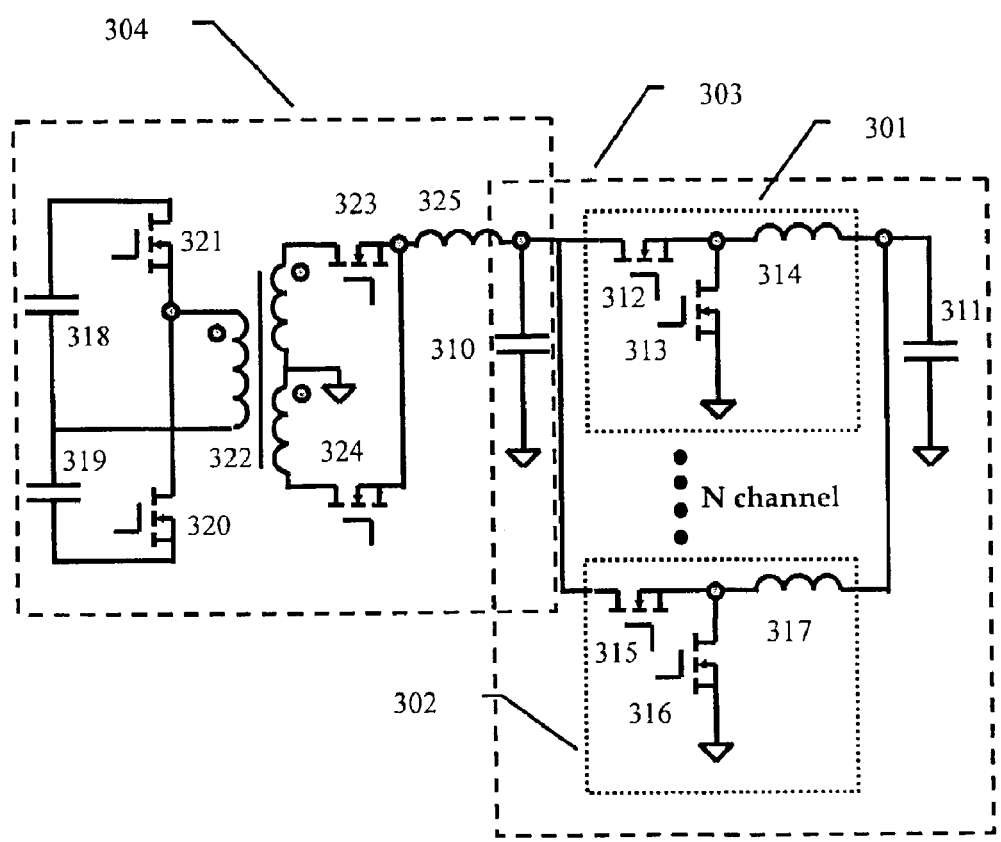
FIG. 3 illustrates two-stages 48V input VRM with a front half-bridge converter and a post interleaved synchronous buck converter according to the prior art.
Figure 5:
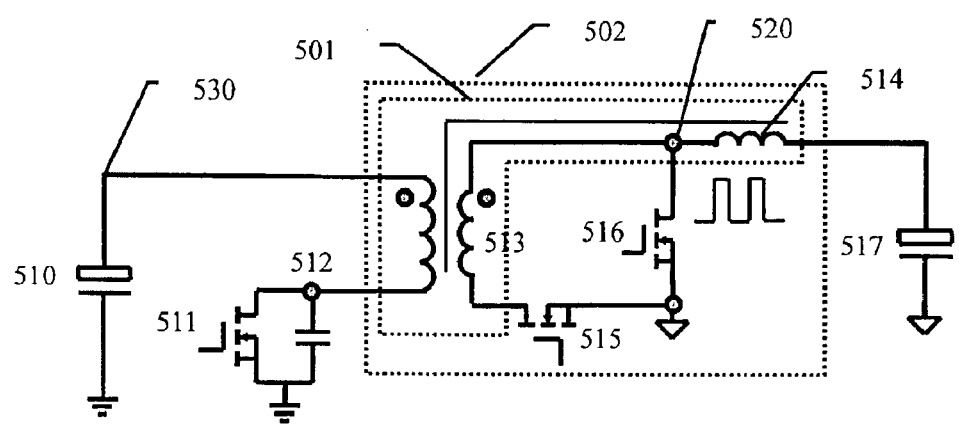
FIG. 5 illustrates the basic cell for the present scheme shown in FIG. 4.

FIG. 5 shows a basic cell for the present topology. A DC voltage Vin at an input capacitor 510 is connected to the output lead through a rectifier circuit 502, and a switch 511. In the rectifier circuit 502, the transformer 513 is integrated into the output inductor 514. So it involves one magnetic device 501 just like that in the buck rectifier circuit. Two synchronous rectifying switches are also used in the rectifier circuit. For convenient driving consideration, the rectifying switch 515 is placed in a common ground mode with the freewheeling switch 516. When primary energy is need to be transferred to secondary side, the rectifying switch 515 turns on and the freewheeling switch 516 turns off, there will be a high level on the terminal 520. When no primary energy is needed, the rectifying switch 515 turns off and the freewheeling switch 516 turns on, there will be a low level on the terminal 520. Therefore, there is a square waveform on the terminal 520 just like that on the terminal 216 in FIG. 2. The power switch 511 provides energy to the output of the whole circuit during ON stage. During the power switch 511 on OFF state, a capacitor 512 is shunted with the power switch 511 for magnetic reset of the transformer 513 in a resonant reset forward converter. In fact, the whole circuit is almost same as the 12V or 5V input buck VRM with one more switch to isolate the input voltage and the post circuit under abnormal operation. Both of them contain three switch MOSFETs, one magnetic device and filtering capacitor.

Figure 6:
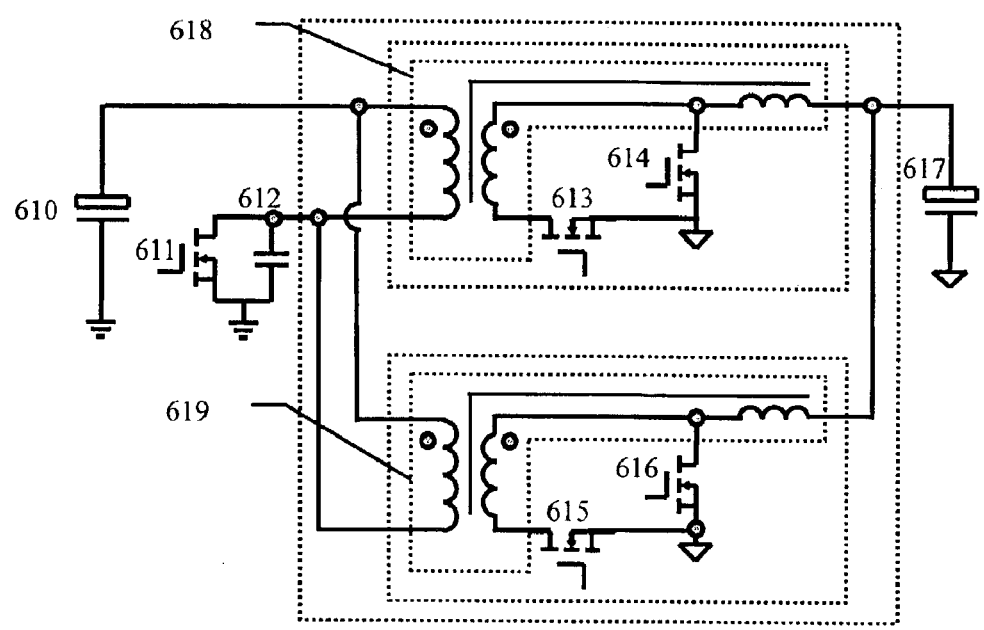
FIG. 6 illustrates an improved basic cell including two paralleled rectifiers.

FIG. 6 shows another basic cell for the proposed topology. It is more suitable to a high output current application. In this topology two rectifiers are paralleled both in primary side and secondary side.

Figure 7:
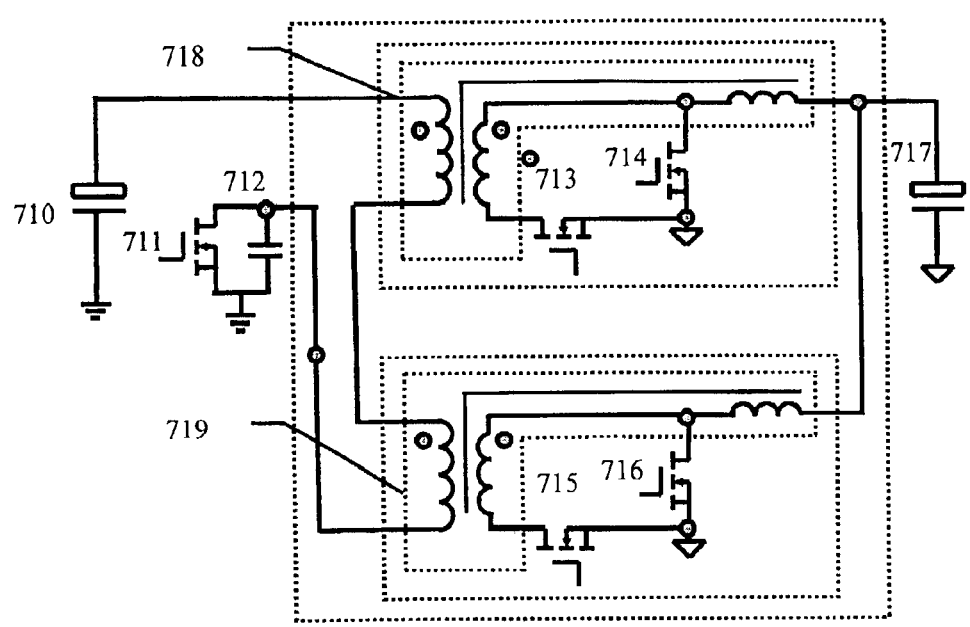
FIG. 7 illustrates another improved basic cell with two rectifiers paralleled in secondary side and in series in primary side.

FIG. 7 shows one more basic cell for the proposed topology. In this topology, the rectifier circuits are in series in the primary side and in parallel in the secondary side. This structure keeps the high output current capability.

Further more, the series structure in primary side reduces the turn ratio of transformer then improves the transformer's coupling. Good coupling is beneficial to low leakage inductance and reduction of dead time for output current commutation. So the efficiency of converter is increased.

Figure 8:
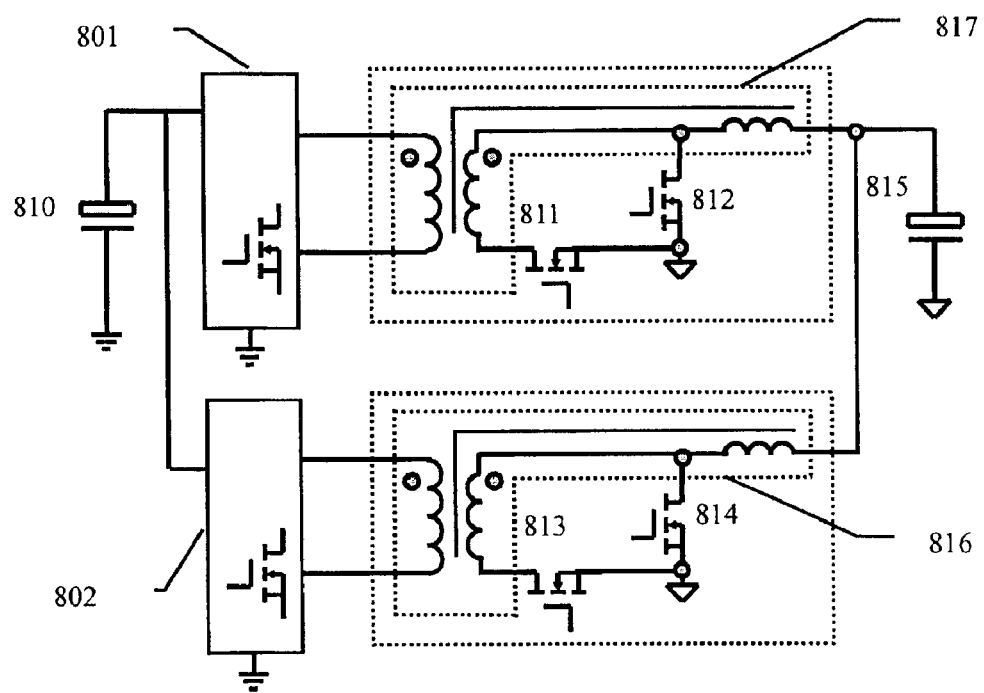
FIG. 8 illustrates a proposed schematic with common topology in primary side.

Other circuits also can provide expected AC voltage to the rectifier circuit in the primary side as shown in FIG. 8. They can be active-clamp forward, dual switch resonant reset forward, dual switch active clamp forward and other topologies. All of them support a positive voltage to the rectifier circuit during the first interval when the main switch turns on; and reset the magnetic device during a second interval other than the first interval.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. An isolated voltage regulator, comprising:
   an integrated magnetic device for performing both transformer and output choke filter function, comprising:
   a first transformer having a first primary winding and a first secondary winding;
   a second transformer having a second primary winding and a second secondary winding;
   a first choke filter having one end coupled to a first terminal of said first secondary winding; and
   a second choke filter having one end coupled to a first terminal of said second secondary winding, and the other end of said second choke filter coupled to the other end of said first choke filter to form the output terminal of said isolated voltage regulator;
   a first switch having a first electrode connected to said first terminal of said first secondary winding, and a second electrode connected to ground;
   a second switch having a first electrode connected to a second terminal of said first secondary winding, and a second electrode connected to ground;
   a third switch having a first electrode connected to said first terminal of said second secondary winding, and a second electrode connected to ground; and
   a fourth switch having a first electrode connected to a second terminal of said second secondary winding, and a second electrode connected to ground; wherein said first transformer, said first choke filter, said first switch and said second switch form a first channel, and said second transformer, said second choke filter, said third switch and said fourth switch form a second channel, and the phase difference between said first channel and said second channel is 180°; and wherein said first secondary winding, said first choke filter, said first switch and said second switch form a first buck rectifier circuit, and said second secondary winding, said second choke filter, said third switch and said fourth switch form a second buck rectifier circuit, and said isolated voltage regulator is an interleaved synchronous buck converter thereby.

2. The isolated voltage regulator according to claim 1, wherein said isolated voltage regulator further comprises a first main switch in parallel a first capacitor connected to said first primary winding, and a second main switch in parallel a second capacitor connected to said second primary winding.

3. The isolated voltage regulator according to claim 1, wherein said first primary winding is in parallel with said second primary winding.

4. The isolated voltage regulator according to claim 3, wherein said isolated voltage regulator further comprises a main switch in parallel with a capacitor connected to said first primary and said second primary windings.

5. The isolated voltage regulator according to claim 1, wherein said first primary winding is in series with said second primary winding.

6. The isolated voltage regulator according to claim 5, wherein said isolated voltage regulator further comprises a main switch in parallel with a capacitor connected to said second primary windings.

7. The isolated voltage regulator according to claim 1, wherein one of an active-clamp forward circuit, a dual switch resonant reset forward circuit, and a dual switch active clamp forward circuit is connected to said first primary and said secondary windings.

8. The isolated voltage regulator according to claim 1, wherein said isolated voltage regulator further comprises a capacitor filter coupled to said output terminal of said isolated voltage regulator.

9. An interleaved voltage regulator comprising plural channels, each of channels comprising:
- a common integrated magnetic device for performing both transformer and output choke filter function, comprising a transformer, and a choke filter having one end coupled to a first terminal of a first secondary winding of said transformer;
- a first switch having a first electrode connected to said first terminal of said first secondary winding, and a second electrode connected to ground; and
- a second switch having a first electrode connected to a second terminal of said first secondary winding, and a second electrode connected to ground, wherein said secondary winding, said choke filter, said first switch, and second switch form a rectifier circuit, wherein the phase difference between each adjacent channel of the interleaved voltage regulator has a value of 360° divided by the number of said plural channels.

10. The interleaved voltage regulator according to claim 9, wherein said first switch, and second switch are two synchronous rectifying switches.

11. An interleaved buck converter comprising plural channels, each of channels comprising:
- a common integrated magnetic device for performing both transformer and output choke filter function, comprising a transformer, and a choke filter having one end coupled to a first terminal of a first secondary winding of said transformer;
- a first switch having a first electrode connected to said first terminal of said first secondary winding, and a second electrode connected to ground; and
- a second switch having a first electrode connected to a second terminal of said first secondary winding, and a second electrode connected to ground, wherein said secondary winding, said choke filter, said first switch, and second switch form a rectifier circuit, wherein the phase difference between each adjacent channel of the interleaved buck converter has a value of 360° divided by the number of said plural channels.

12. The interleaved buck converter according to claim 11, wherein said first switch, and second switch are two synchronous rectifying switches.

* * * * *